(12) United States Patent
Leong (10) Patent No.: US 11,049,505 B1
(45) Date of Patent: *Jun. 29, 2021

(54) VIRTUAL ASSISTANT IDENTIFICATION OF NEARBY COMPUTING DEVICES

(71) Applicant: Google LLC, Mountain View, CA (US)

(72) Inventor: Jian Wei Leong, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/201,808

(22) Filed: Mar. 15, 2021

Related U.S. Application Data (63) Continuation of application No. 16/409,389, filed on May 10, 2019, which is a continuation of application No. 15/355,336, filed on Nov. 18, 2016, now Pat. No. 10,332,523.

(51) Int. Cl.
　　*G10L 15/30*　　(2013.01)
　　*G06F 3/16*　　(2006.01)
　　*G10L 15/22*　　(2006.01)

(52) U.S. Cl.
　　CPC .............. *G10L 15/30* (2013.01); *G06F 3/165* (2013.01); *G10L 15/22* (2013.01); *G10L 2015/221* (2013.01); *G10L 2015/223* (2013.01)

(58) Field of Classification Search
　　None
　　See application file for complete search history.

(56) References Cited

U.S. PATENT DOCUMENTS

| | | | |
|---|---|---|---|
| 5,623,652 A * | 4/1997 | Vora | G06F 16/338 707/742 |
| 5,625,697 A | 4/1997 | Bowen et al. | |
| 6,038,614 A | 3/2000 | Chan et al. | |
| 6,069,621 A | 5/2000 | Schupak | |
| 6,185,535 B1 | 2/2001 | Hedin et al. | |
| 7,184,960 B2 | 2/2007 | Deisher et al. | |
| 8,903,892 B2 * | 12/2014 | Stinson | H04L 67/42 709/203 |

(Continued)

FOREIGN PATENT DOCUMENTS

| | | |
|---|---|---|
| CN | 104423576 | 3/2015 |
| CN | 105051676 | 11/2015 |

(Continued)

OTHER PUBLICATIONS

Chinese Patent Office; Office Action issued for Application No. 201710901158 dated Jun. 16, 2020.

(Continued)

*Primary Examiner* — Neeraj Sharma
(74) *Attorney, Agent, or Firm* — Middleton Reutlinger (57) ABSTRACT

In one example, a method includes method comprising: receiving audio data generated by a microphone of a current computing device; identifying, based on the audio data, one or more computing devices that each emitted a respective audio signal in response to speech reception being activated at the current computing device; and selecting either the current computing device or a particular computing device from the identified one or more computing devices to satisfy a spoken utterance determined based on the audio data.

20 Claims, 5 Drawing Sheets

(56) References Cited

U.S. PATENT DOCUMENTS

| | | | |
|---|---|---|---|
| 9,984,686 B1* | 5/2018 | Mutagi | G10L 15/02 |
| 10,002,115 B1 | 6/2018 | Killian et al. | |
| 10,904,624 B2* | 1/2021 | Vaysman | H04N 21/4828 |
| 2003/0167335 A1 | 9/2003 | Alexander | |
| 2008/0225013 A1* | 9/2008 | Muylkens | G06F 3/04883 |
| | | | 345/173 |
| 2009/0204611 A1 | 8/2009 | Kamada et al. | |
| 2010/0088100 A1 | 4/2010 | Lindahl | |
| 2011/0225531 A1* | 9/2011 | Irizarry | G05B 19/042 |
| | | | 715/771 |
| 2011/0257971 A1 | 10/2011 | Morrison | |
| 2011/0283334 A1 | 11/2011 | Choi et al. | |
| 2012/0034904 A1 | 2/2012 | LeBeau et al. | |
| 2013/0091309 A1 | 4/2013 | Bjontegard et al. | |
| 2013/0108076 A1 | 5/2013 | Chu et al. | |
| 2013/0183944 A1 | 7/2013 | Mozer et al. | |
| 2013/0275164 A1 | 10/2013 | Gruber et al. | |
| 2014/0038669 A1 | 2/2014 | Shimizu et al. | |
| 2014/0304280 A1 | 10/2014 | Oursbourn et al. | |
| 2014/0310643 A1* | 10/2014 | Karmanenko | G06F 1/1647 |
| | | | 715/784 |
| 2014/0331145 A1 | 11/2014 | Schoenefeld | |
| 2015/0161998 A1 | 6/2015 | Park et al. | |
| 2015/0172878 A1 | 6/2015 | Luna | |
| 2015/0228274 A1 | 8/2015 | Leppanen et al. | |
| 2015/0332431 A1* | 11/2015 | Tsuchida | G09G 5/18 |
| | | | 345/660 |
| 2015/0370531 A1 | 12/2015 | Faaborg | |
| 2015/0382047 A1 | 12/2015 | Van Os et al. | |
| 2016/0117793 A1* | 4/2016 | Sierra | G06T 1/20 |
| | | | 345/502 |
| 2016/0155443 A1 | 6/2016 | Khan et al. | |
| 2016/0179462 A1 | 6/2016 | Bjorkengren | |
| 2016/0180853 A1 | 6/2016 | VanLund et al. | |
| 2016/0260434 A1 | 9/2016 | Gelfenbeyn et al. | |
| 2016/0277808 A1* | 9/2016 | Yu | H04N 21/41407 |
| 2016/0301810 A1 | 10/2016 | Dimitroff et al. | |
| 2016/0366084 A1 | 12/2016 | Malahy | |
| 2016/0379638 A1 | 12/2016 | Basye et al. | |
| 2017/0083285 A1 | 3/2017 | Meyers et al. | |
| 2017/0251340 A1 | 8/2017 | Sanders et al. | |
| 2018/0061404 A1 | 3/2018 | Devaraj et al. | |
| 2018/0061419 A1 | 3/2018 | Melendo Casado et al. | |
| 2018/0253201 A1 | 9/2018 | High et al. | |

FOREIGN PATENT DOCUMENTS

| | | |
|---|---|---|
| CN | 105264485 | 1/2016 |
| EP | 2298178 | 3/2011 |
| EP | 2740413 | 6/2014 |
| EP | 2963630 | 1/2016 |
| JP | 2003223188 | 8/2003 |
| JP | 2007178934 | 7/2007 |
| JP | 2016519805 | 7/2016 |
| JP | 2017520008 | 7/2017 |
| KR | 20100022297 | 3/2010 |
| KR | 20110125725 | 11/2011 |
| WO | 2016085776 | 6/2016 |

OTHER PUBLICATIONS

United Kingdom Intellectual Property Office; Intention to Grant issued in Application No. 1715712.4 dated Mar. 17, 2020.

Japanese Patent Office; Notice of Allowance issued in Application No. 2019-526534 dated Dec. 2, 2019.

European Patent Office; Intention to Grant issued in App. No. 178050167; 43 pages; dated Sep. 16, 2019.

European Patent Office; International Report on Patentablity of Application No. PCT/US2017/059342; 17 pages; dated Oct. 15, 2018.

United Kingdon Intellectual Property Office; Combined Search and Examination Report issued in Application No. 1715712.4 dated Mar. 23, 2018.

European Patent Office; International Search Report and Written Opinion issued in Application No. PCT/US2017/059342 dated Feb. 16, 2018.

Issue 34348: Voice input should support Bluetooth microphones, Android Open Source Project—Issue Tracker, Jun. 2013, Retrieved from <https://code.google.com/p/android/issues/detail?id=34348> 8 pp.

LeFebvre, "Tell Siri Which Audio Input to Listen to [iOS Tips]," Cult of Mac, May 14, 2013, Retrieved from <http://www.cultofmac.com/227210/tell-siri-which-audio-input-to-listen-to-ios-tips/> 8 pp.

Exclusive: Google Will Soon Introduce 'Nearby' to Let Other 'People, Places, and Things' Know When You're Around, Jun. 6, 2014, Retrieved from http://www.androidpolice.com/2014/06/06/exclusive-google-will-soon-introduce-nearby-to-let-other-people-places-and-things-know-when-youre-around/. 10 pp.

Use Nearby to interact with what's around you—Accounts Help, Retrieved on Oct. 5, 2016 from https://support.google.com/accounts/answer/6260286?hl=en, 5 pp.

Howard, "Activate Google Now "listening" via bluetooth headset," Google Product Forms, Jun. 30, 2013, Retrieved from <https://productforums.google.com/forum/print/msg/websearch/-cTsRaVV5F4/jeSHROtqUqlj> 2 pp.

Korean Patent Office; Notice of Allowance issued in Application No. 1020197015790; 3 pages; dated Apr. 12, 2021.

Korean Patent Office; Notice of Office Action issued in Application No. 10-2019-7015790; 15 pages; dated Sep. 28, 2020.

China National Intellectual Property Administration; Notice of Allowance issued in Application No. 201710901158.X; 4 pages; dated May 11, 2020.

Intellectual Property India; Examination Report issued in Application No. 201927022517; 6 pages; dated Oct. 29, 2020.

Deutsches Patent Office; Office Action issued in Application No. 102017122182; 7 pages; dated Mar. 26, 2021.

* cited by examiner

VIRTUAL ASSISTANT IDENTIFICATION OF NEARBY COMPUTING DEVICES

BACKGROUND

Some computing devices may provide a user interface from which a user can chat, speak, or otherwise communicate with a virtual, computational assistant (e.g., also referred to as "an intelligent assistant" or simply as an "assistant") to cause the assistant to output useful information, respond to a user's needs, or otherwise perform certain operations to help the user complete a variety of real-world or virtual tasks. The assistant may output the information, respond to the user's needs, or otherwise perform operations, via the computing device that provides the user interface through which the user is communicating with the assistant, and/or output information via other, different, computing devices from which the assistant has access.

SUMMARY

In general, techniques of this disclosure may enable a virtual, computational assistant (e.g., also referred to as "an intelligent assistant" or simply as an "assistant") provided via a current computing device to automatically identify other computing devices that may be used to respond to user input (e.g., for satisfying user utterances or textual input). For instance, in response to speech reception being activated, a current computing device may cause other computing devices to emit respective audio signals. The current computing device may receive, with a microphone, acoustic input (e.g., audio data) that corresponds to a user utterance and the audio signals emitted by the other computing devices. Based on the acoustic input, the assistant may identify the other computing devices.

Identifying other computing devices may enable the assistant to select another computing device (i.e., other than the current computing device) to satisfy the user utterance. For instance, if a particular computing device of the identified other computing devices is more well-suited to satisfy the user utterance than the current computing device, the assistant may select the particular computing device to satisfy the user utterance. Otherwise the assistant may satisfy the utterance using the current computing device. In this way, the assistant may provide higher quality satisfaction of utterances by selecting the most suited device out of the available devices for satisfying the user utterance.

In one example, a method includes method comprising: receiving audio data generated by a microphone of a current computing device; identifying, based on the audio data, one or more computing devices that each emitted a respective audio signal in response to speech reception being activated at the current computing device; and selecting either the current computing device or a particular computing device from the identified one or more computing devices to satisfy a spoken utterance determined based on the audio data.

In another example, a device includes one or more microphones; and one or more processors configured to: receive audio data generated by a microphone of a current computing device; identify, based on the audio data, one or more computing devices that each emitted a respective audio signal in response to speech reception being activated at the current computing device; and select either the current computing device or a particular computing device from the identified one or more computing devices to satisfy a spoken utterance determined based on the audio data.

In another example, a non-transitory computer-readable storage medium storing instructions that, when executed, cause one or more processors of a computing device to: receive audio data generated by a microphone of a current computing device; identify, based on the audio data, one or more computing devices that each emitted a respective audio signal in response to speech reception being activated at the current computing device; and select either the current computing device or a particular computing device from the identified one or more computing devices to satisfy a spoken utterance determined based on the audio data.

In another example, a system includes means for receiving audio data generated by a microphone of a current computing device; means for identifying, based on the audio data, one or more computing devices that each emitted a respective audio signal in response to speech reception being activated at the current computing device; and means for selecting either the current computing device or a particular computing device from the identified one or more computing devices to satisfy a spoken utterance determined based on the audio data.

The details of one or more examples are set forth in the accompanying drawings and the description below. Other features, objects, and advantages of the disclosure will be apparent from the description and drawings, and from the claims.

DETAILED DESCRIPTION

Figure 1:
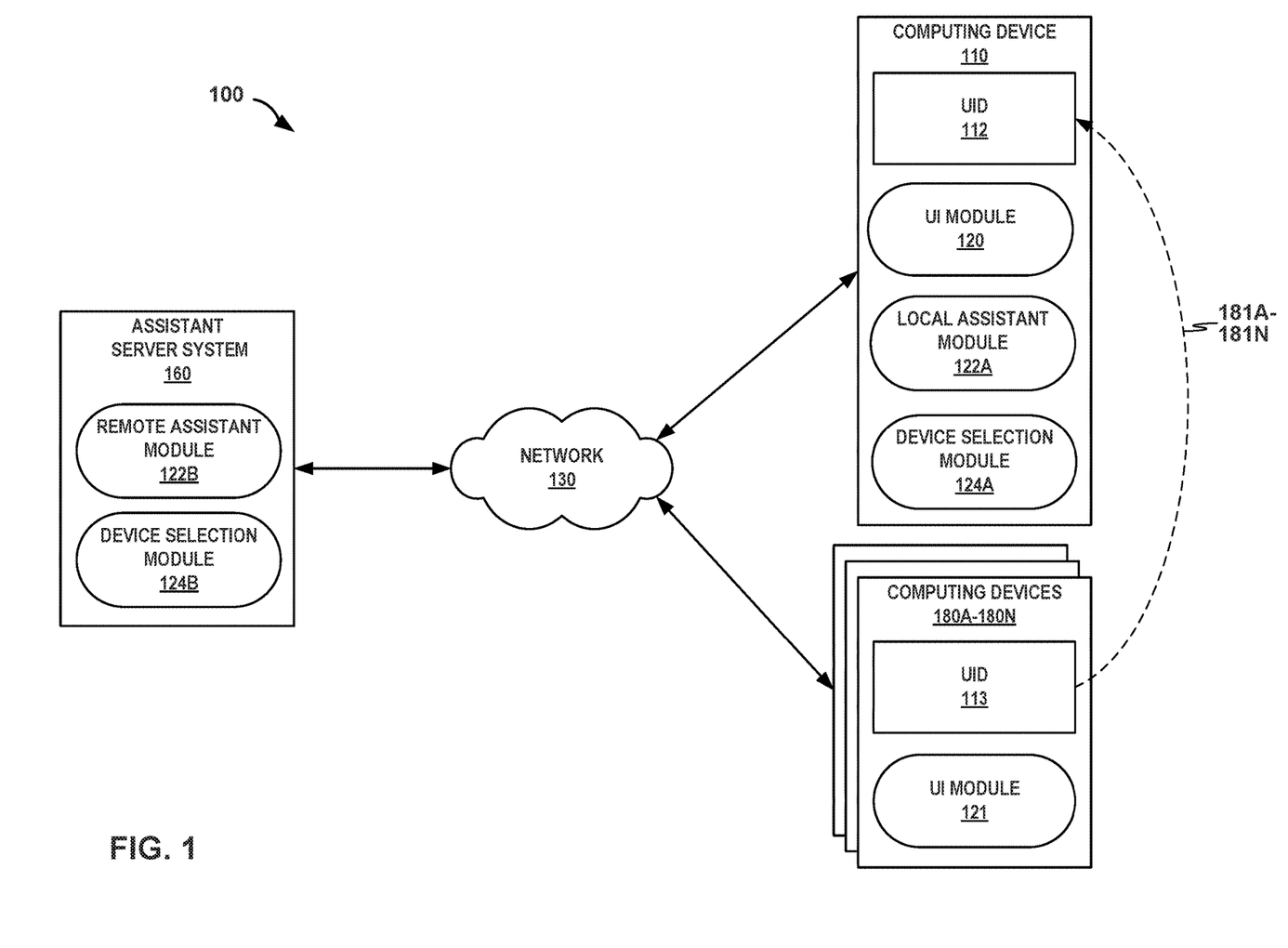
FIG. 1 is a conceptual diagram illustrating an example system that executes an example virtual assistant, in accordance with one or more aspects of the present disclosure.

FIG. 1 is a conceptual diagram illustrating an example system that executes an example virtual assistant, in accordance with one or more aspects of the present disclosure. System 100 of FIG. 1 includes assistant server system 160 in communication, via network 130, with computing device 110 and computing devices 180A-180N (collectively, "computing devices 180"). Although system 100 is shown as being distributed amongst assistant server system 160, computing device 110, and computing devices 180, in other examples, the features and techniques attributed to system 100 may be performed internally, by local components of computing device 110. Similarly, assistant server system 160 may include certain components and perform various techniques that are otherwise attributed in the below description to computing device 110 and/or computing devices 180.

Network 130 represents any public or private communications network, for instance, cellular, Wi-Fi, and/or other types of networks, for transmitting data between computing systems, servers, and computing devices. Assistant server system 160 may exchange data, via network 130, with computing device 110 to provide a virtual assistant service that is accessible to computing device 110 when computing device 110 is connected to network 130. Assistant server system 160 may exchange data, via network 130, with computing devices 180 to cause one or more of computing devices 180 to perform various activities. Computing device 110 may exchange data, via network 130, with computing devices 180 to cause one or more of computing devices 180 to perform various activities.

Network 130 may include one or more network hubs, network switches, network routers, or any other network equipment, that are operatively inter-coupled thereby providing for the exchange of information between server system 160, computing device 110, and computing devices 180. Computing device 110, assistant server system 160, and computing devices 180 may transmit and receive data across network 130 using any suitable communication techniques. Computing device 110, assistant server system 160, and computing devices 180 may each be operatively coupled to network 130 using respective network links. The links coupling computing device 110, assistant server system 160, and computing devices 180 to network 130 may be Ethernet or other types of network connections and such connections may be wireless and/or wired connections.

Assistant server system 160 may represent any suitable remote computing system, such as one or more desktop computers, laptop computers, mainframes, servers, cloud computing systems, etc. capable of sending and receiving information both to and from a network, such as network 130. Assistant server system 160 hosts (or at least provides access to) a virtual assistant service. In some examples, assistant server system 160 represents a cloud computing system that provides access to the virtual assistant service via a cloud.

Computing device 110 represents an individual mobile or non-mobile computing device. Examples of computing device 110 include a mobile phone, a tablet computer, a laptop computer, a desktop computer, a server, a mainframe, a camera, a set-top box, a television, a wearable device (e.g., a computerized watch, computerized eyewear, computerized gloves, etc.), a home automation device or system (e.g., an intelligent thermostat or home assistant device), a personal digital assistants (PDA), a gaming system, a media player, an e-book reader, a mobile television platform, an automobile navigation or infotainment system, or any other type of mobile, non-mobile, wearable, and non-wearable computing device configured to execute or access a virtual assistant and receive information via a network, such as network 130.

Assistant server system 160 may communicate with computing device 110 via network 130 to give computing device 110 access the virtual assistant service provided by assistant server system 160. In the course of providing virtual assistant services, assistant server system 160 may communicate with a search server system (not shown) via network 130 to obtain search results for providing a user of the virtual assistant service information to complete a task.

In the example of FIG. 1, assistant server system 160 includes remote assistant module 122B and device selection module 124B. Computing device 110 includes user interface device (UID) 112, user interface (UI) module 120, local assistant module 122A, and device selection module 124A. Computing devices 180 each include UID 113 and UI module 121. Remote assistant module 122B and local assistant module 122A may be referred to collectively as assistant modules 122. Device selection module 124A and device selection module 124B may be referred to collectively as device selection modules 124.

Modules 120, 121, 122, and 124 may perform operations described using software, hardware, firmware, or a mixture of hardware, software, and firmware residing in and/or executing at one of computing device 110, assistant server system 160, or computing devices 180. Computing device 110, assistant server system 160, and computing devices 180 may execute modules 120, 121, 122, and 124 with multiple processors or multiple devices. Computing device 110, assistant server system 160, and computing devices 180 may execute modules 120, 121, 122, and 124 as virtual machines executing on underlying hardware. Modules 120, 121, 122, and 124 may execute as one or more services of an operating system or computing platform. Modules 120, 121, 122, and 124 may execute as one or more executable programs at an application layer of a computing platform.

UID 112 of computing device 110 may function as an input and/or output device for computing device 110. UID 112 may be implemented using various technologies. For instance, UID 112 may function as an input device using presence-sensitive input screens, such as resistive touch-screens, surface acoustic wave touchscreens, capacitive touchscreens, projective capacitance touchscreens, pressure sensitive screens, acoustic pulse recognition touchscreens, or another presence-sensitive display technology.

UID 112 may function as an input device using microphone technologies, infrared sensor technologies, or other input device technology for use in receiving user input. For example, UID 112 may detect, using built-in microphone technology, voice input that UI module 120 and/or local assistant module 122A processes for completing a task. As another example, UID 112 may include a presence-sensitive display that may receive tactile input from a user of computing device 110. UID 112 may receive indications of tactile input by detecting one or more gestures from a user (e.g., the user touching or pointing to one or more locations of UID 112 with a finger or a stylus pen).

UID 112 may function as output (e.g., display) device and present output to a user. UID 112 may function as an output device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110. UID 112 may function as output device using speaker technologies, haptic feedback technologies, or other output device technology for use in outputting information to a user. UID 112 may present a user interface (e.g., user interface 114) related to a virtual assistant provided by local assistant module 122A and/or remote assistant module 122B. UID 112 may present a user interface related to other features of computing platforms, operating systems, applications, and/or services executing at and/or accessible from computing device 110 (e.g., e-mail, chat, online services, telephone, gaming, etc.).

UI module 120 may manage user interactions with UID 112 and other components of computing device 110 including interacting with assistant server system 160 so as to provide assistant services via UID 112. UI module 120 may cause UID 112 to output a user interface as a user of computing device 110 views output and/or provides input at UID 112. UI module 120 and UID 112 may receive one or more indications of input (e.g., voice input, gesture input, etc.) from a user as the user interacts with the user interface, at different times and when the user and computing device 110 are at different locations. UI module 120 and UID 112 may interpret inputs detected at UID 112 and may relay information about the inputs detected at UID 112 to local assistant module 122A and/or one or more other associated platforms, operating systems, applications, and/or services executing at computing device 110, for example, to cause computing device 110 to perform functions.

UI module 120 may receive information and instructions from one or more associated platforms, operating systems, applications, and/or services executing at computing device 110 and/or one or more remote computing systems, such as server system 160 and computing devices 180. In addition, UI module 120 may act as an intermediary between the one or more associated platforms, operating systems, applications, and/or services executing at computing device 110, and various output devices of computing device 110 (e.g., speakers, LED indicators, audio or haptic output device, etc.) to produce output (e.g., a graphic, a flash of light, a sound, a haptic response, etc.) with computing device 110.

Local assistant module 122A of computing device 110 and remote assistant module 122B of assistant server system 160 may each perform similar functions described herein for automatically executing an assistant. Remote assistant module 122B and device selection module 124B represent server-side or cloud implementations of an example virtual assistant whereas local assistant module 122A and device selection module 124A represent a client-side or local implementation of the example virtual assistant.

Modules 122 may each include respective software agents configured to execute as intelligent personal assistants that can perform tasks or services for an individual, such as a user of computing device 110. Modules 122 may perform these tasks or services based on user input (e.g., detected at UID 112), location awareness (e.g., based on context), and/or the ability to access other information (e.g., weather or traffic conditions, news, stock prices, sports scores, user schedules, transportation schedules, retail prices, etc.) from a variety of information sources (e.g., either stored locally at computing device 110, assistant server system 160, or obtained via a search service. Performing a task or service based on spoken user input may be referred to herein as satisfying a user utterance. Modules 122 may perform artificial intelligence and/or machine learning techniques to automatically identify and complete one or more tasks on behalf of a user.

As discussed above, modules 122 may perform tasks or services based on spoken user input. Modules 122 may receive audio data (i.e., from UI module 120) generated by one or more microphones of UID 112. Modules 122 may selectively process the received audio data to recognize utterances when speech reception is active. Speech reception may be activated in a number of ways. As one example, modules 122 may activate speech reception in response to recognizing a predetermined activation phrase in the received audio data (e.g., "listen assistant"). As another example, UI module 120 may cause modules 122 to activate speech reception in response to a user pressing a speech reception button on computing device 110.

Modules 122 may satisfy user utterances via output presented by one or more components of computing device 110. For instance, modules 122 may cause one or more components of UID 112 (e.g., displays, speakers, etc.) to produce output (e.g., display video, display graphical user interfaces, emit sound, etc.). In some examples, it may be desirable for modules 122 to satisfy some user utterances by causing other computing devices to present output. For instance, if another computing device is more well-suited to satisfy a user utterance, it may be desirable for modules 122 to present output via the other computing device. However, even if another computing device is more well-suited to satisfy a user utterance, it may not be desirable for modules 122 to present output via the other computing device if the user who provided the utterance is not able to receive output presented by the other computing device.

In accordance with one or more techniques of this disclosure, the assistant may identify one or more other computing devices that may be used to respond to user input (e.g., for satisfying user utterances or textual input). Identifying other computing devices may enable the assistant to select another computing device (i.e., other than computing device 110) to satisfy the user utterance. For instance, if a particular computing device of the identified other computing devices is more well-suited to satisfy the user utterance than computing device 110, the assistant may select the particular computing device to satisfy the user utterance. In this way, the assistant may provide higher quality satisfaction of utterances.

In some examples, the assistant may periodically identify the one or more other computing devices that may be used to respond to user input (e.g., every 5 minutes, 10 minutes, 30 minutes, 1 hour, 1 day, etc.). However, in some examples, it may not be desirable to periodically identify the other computing devices. For instance, computing device may have moved such that the identified devices are no longer near computing device 110 (i.e., the identification may have become outdated). Additionally, computing device 110 may be a battery powered device and periodic identification may unnecessarily consume battery power of computing device 110.

In accordance with one or more techniques of this disclosure, the assistant may identify the one or more other computing devices in response to speech reception being activated at computing device 110. In some examples, the assistant may perform a single identification of the other computing devices in response to speech reception being activated at computing device 110. In some examples, the assistant may perform an initial identification of the other computing devices in response to speech reception being activated at computing device 110, and continue to update the identification of the other computing devices while speech reception remains activated at computing device 110. For instance, if computing device 180A is a TV located in a living room and computing device 180B is a TV located in a kitchen and speech reception is activated while computing device 110 is in the living room, the assistant may initially identify that computing device 180A is the most well-suited TV. Then, if computing device 110 is carried into the kitchen while the user speaks an utterance, the assistant may identify that computing device 180B is the most well-suited TV.

Additionally, by beginning the identification of the other computing devices in response to speech reception being activated, the assistant may more quickly select a computing device to respond to user input. For example, the assistant may avoid waiting until the user is finished speaking an utterance to start identification of other computing devices that may be selected to satisfy the utterance. In this way, the assistant may identify computing devices that may be used to respond to spoken input in parallel with reception of the spoken input.

In operation, a user may activate speech reception at computing device 110 and speak an utterance. In response to speech reception being activated, computing device 110 may perform one or more operations to determine whether there any other computing devices nearby that may be used to satisfy spoken utterances. For instance, one or both of device selection modules 124 may cause computing devices 180 to emit respective sounds (illustrated in FIG. 1 as sounds 181A-181N, collectively "sounds 181"). For instance, device selection module 124A may send a message, via network 130, to device selection module 124B indicating that speech reception has been activated at computing device 110. In response to receiving the message, device selection module 124B may sent requests to computing devices 180 to emit respective sounds 181. For instance, device selection module 124B may sent a request to computing device 180A to emit sound 181A, send a request to computing device 180B to emit sound 181B, and send a request to computing device 180N to emit sound 181N. In some examples, one or more of the requests may be sent by device selection module 124A.

In some examples, the requests may specify one or more audio characteristics of the sounds. For instance, the requests sent to computing devices 180 may specify respective frequencies at which computing devices 180 are to emit sounds 181. In other words, each of computing devices 180 may be assigned a different emission frequency. In some examples, the frequencies may be above typical human voice frequencies (e.g., above 300 Hz). In this way, the assistant may be able to better differentiate between sounds 181 and the spoken utterance. In some examples, the frequencies may be above the range of human hearing (e.g., above 20 kHz). In this way, the emission of sounds 181 may be transparent to the user and/or not be bothersome to the user.

One or both of device selection modules 124 may process audio data generated by one or more microphones of UID 112 to identify other computing devices that may be used to satisfy the user utterance. If the received audio data includes a respective sound emitted by a respective computing device of computing devices 180, one or both of device selection modules 124 may determine that the respective computing device is eligible for selection to satisfy the spoken utterance. For instance, if the received audio data includes sound 181A, device selection module 124A may determine that computing device 180A is eligible for selection to satisfy the spoken utterance. Similarly, if the received audio data does not include sound 181B, device selection module 124A may determine that computing device 180B is not eligible for selection to satisfy the spoken utterance.

The assistant may similarly process audio data generated by one or more microphones of UID 112 to recognize the user utterance. For instance, local assistant module 122A may process audio data generated by one or more microphones of UID 112 to recognize the user utterance in parallel with the identification of other computing devices.

One or both of device selection modules 124 may select one or more computing devices to satisfy the spoken utterance. For instance, device selection module 124A may interface with local assistant module 122A to select one or more of computing device 110, and computing devices from the identified computing devices of computing devices 180 that are best suited to satisfy the spoken utterance. As one example, if computing device 110 does not include a display and the utterance would be better satisfied with a display (e.g., if the user utterance is "what's on my agenda"), device selection module 124A may select a computing device of the identified other computing devices that includes a display to satisfy the utterance. The utterance "what's on my agenda" may be better satisfied with a display because a visual representation of an agenda may be simpler to understand than, for instance, a synthesized voice reading the agenda. As another example, if computing device 110 includes a display and the utterance would be better satisfied with a larger display (e.g., if the user utterance is "play a video"), device selection module 124A may select a computing device of the identified other computing devices that includes a relatively larger display to satisfy the utterance. The utterance "play a video" may be better satisfied with a relatively larger display because it may be less strenuous and/or more comfortable for a user to watch the video on a larger display (e.g., a TV). As another example, if the utterance is to play music, device selection module 124A may select a computing device of the identified other computing devices that includes higher quality speakers than computing device 110. In this way, the assistant may provide higher quality satisfaction of utterances.

The assistant may cause the selected computing device(s) to perform one or more activities to satisfy the utterance. For instance, if computing device 180A is selected to satisfy the utterance, local assistant module 122A may cause one or more components of UID 113 (e.g., displays, speakers, etc.) to produce output (e.g., display video, display graphical user interfaces, emit sound, etc.). For example, if the utterance is "play a video," local assistant module 122A may cause a display of UID 113 to produce display the video.

It will be appreciated that improved operation of computing device 110 is obtained according to the above description. For example, by identifying other computing devices to satisfy utterances, satisfaction of utterances by computing device 110 may be avoided and/or reduced. This in turn reduces use of bandwidth and data transmission, reduces use of temporary volatile memory, reduces battery drain, etc. Furthermore, in certain embodiments, optimizing device performance and/or minimizing cellular data usage can be features for device selection, such that selection of another device based on these criteria provides the desired direct reductions in battery drain and/or reduced data usage (e.g., selecting another device to satisfy an utterance so the current device avoids consuming battery power to satisfy the utterance and/or avoids using data to satisfy the utterance).

Figure 2:
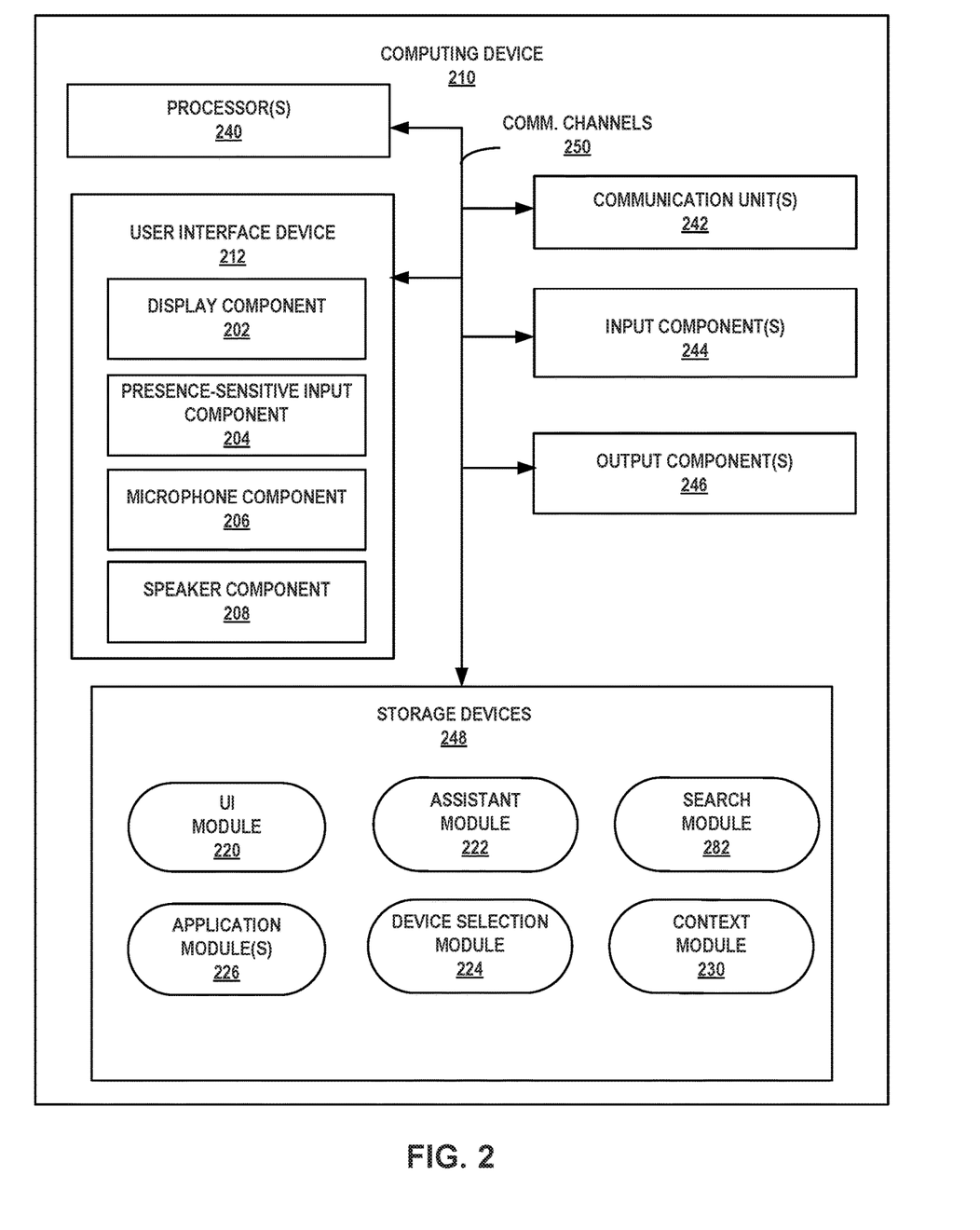
FIG. 2 is a block diagram illustrating an example computing device that is configured to execute an example virtual assistant, in accordance with one or more aspects of the present disclosure.

FIG. 2 is a block diagram illustrating an example computing device that is configured to execute an example virtual assistant, in accordance with one or more aspects of the present disclosure. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface device (USD) 212, one or more processors 240, one or more communication units 242, one or more input components 244, one or more output components 246, and one or more storage devices 248. USD 212 includes display component 202, presence-sensitive input component 204, microphone component 206, and speaker component 208. Storage devices 248 of computing device 210 include UI module 220, assistant module 222, device selection module 224, search module 282, one or more application modules 226, and context module 230.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices (e.g., assistant server system 160 and/or computing devices 180 of system 100 of FIG. 1) via one or more wired and/or wireless networks by transmitting and/or receiving network signals on one or more networks (e.g., network 130 of system 100 of FIG. 1). Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, step counter sensor.

One or more output components 246 of computing device 210 may generate output. Examples of output are tactile, audio, and video output. Output components 246 of computing device 210, in one example, includes a presence-sensitive display, sound card, video graphics adapter card, speaker, cathode ray tube (CRT) monitor, liquid crystal display (LCD), or any other type of device for generating output to a human or machine.

UID 212 of computing device 210 may be similar to UID 112 of computing device 110 and includes display component 202, presence-sensitive input component 204, microphone component 206, and speaker component 208. Display component 202 may be a screen at which information is displayed by USD 212 while presence-sensitive input component 204 may detect an object at and/or near display component 202. Speaker component 208 may be a speaker from which audible information is played by UID 212 while microphone component 206 may detect audible input provided at and/or near display component 202 and/or speaker component 208.

While illustrated as an internal component of computing device 210, UID 212 may also represent an external component that shares a data path with computing device 210 for transmitting and/or receiving input and output. For instance, in one example, UID 212 represents a built-in component of computing device 210 located within and physically connected to the external packaging of computing device 210 (e.g., a screen on a mobile phone). In another example, UID 212 represents an external component of computing device 210 located outside and physically separated from the packaging or housing of computing device 210 (e.g., a monitor, a projector, etc. that shares a wired and/or wireless data path with computing device 210).

As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, PSD 212 may present a user interface, as a graphical user interface.

Speaker component 208 may comprise a speaker built-in to a housing of computing device 210 and in some examples, may be a speaker built-in to a set of wired or wireless headphones that are operably coupled to computing device 210. Microphone component 206 may detect acoustic input occurring at or near UID 212. Microphone component 206 may perform various noise cancellation techniques to remove background noise and isolate user speech from a detected audio signal.

UID 212 of computing device 210 may detect two-dimensional and/or three-dimensional gestures as input from a user of computing device 210. For instance, a sensor of UID 212 may detect a user's movement (e.g., moving a hand, an arm, a pen, a stylus, etc.) within a threshold distance of the sensor of UID 212. UID 212 may determine a two or three-dimensional vector representation of the movement and correlate the vector representation to a gesture input (e.g., a hand-wave, a pinch, a clap, a pen stroke, etc.) that has multiple dimensions. In other words, UID 212 can detect a multi-dimension gesture without requiring the user to gesture at or near a screen or surface at which UID 212 outputs information for display. Instead, UID 212 can detect a multi-dimensional gesture performed at or near a sensor which may or may not be located near the screen or surface at which UID 212 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 224, 226, 230, and 282 may be operable by processors 240 to perform various actions, operations, or functions of computing device 210. For example, processors 240 of computing device 210 may retrieve and execute instructions stored by storage devices 248 that cause processors 240 to perform the operations modules 220, 222, 224, 226, 230, and 282. The instructions, when executed by processors 240, may cause computing device 210 to store information within storage devices 248.

One or more storage devices 248 within computing device 210 may store information for processing during operation of computing device 210 (e.g., computing device 210 may store data accessed by modules 220, 222, 224, 226, 230, and 282 during execution at computing device 210). In some examples, storage devices 248 is a temporary memory, meaning that a primary purpose of storage devices 248 is not long-term storage. Storage devices 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 248, in some examples, also include one or more computer-readable storage media. Storage devices 248 in some examples include one or more non-transitory computer-readable storage mediums. Storage devices 248 may be configured to store larger amounts of information than typically stored by volatile memory. Storage devices 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or information (e.g., data) associated with modules 220, 222, 224, 226, 230, and 282. Storage devices 248 may include a memory configured to store data or other information associated with modules 220, 222, 224, 226, 230, and 282.

UI module 220 may include all functionality of UI module 120 of computing device 110 of FIG. 1 and may perform similar operations as UI module 120 for managing a user interface that computing device 210 provides at USD 212 for example, for facilitating interactions between a user of computing device 110 and assistant module 222. For example, UI module 220 of computing device 210 may receive information from assistant module 222 that includes instructions for outputting (e.g., displaying or playing audio) an assistant user interface (e.g., user interface 114). UI module 220 may receive the information from assistant module 222 over communication channels 250 and use the data to generate a user interface. UI module 220 may transmit a display or audible output command and associated data over communication channels 250 to cause UID 212 to present the user interface at UID 212.

In some examples, UI module 220 may receive an indication of one or more user inputs detected at UID 212 and may output information about the user inputs to assistant module 222. For example, UID 212 may detect a voice input from a user and send data about the voice input to UI module 220.

UI module 220 may send an indication of the voice input to assistant module 222 for further interpretation. Assistant module 222 may determine, based on the voice input, that the detected voice input represents a user request for assistant module 222 to perform one or more tasks.

Application modules 226 represent all the various individual applications and services executing at and accessible from computing device 210 that may be accessed by an assistant, such as assistant module 222, to provide user with information and/or perform a task. A user of computing device 210 may interact with a user interface associated with one or more application modules 226 to cause computing device 210 to perform a function. Numerous examples of application modules 226 may exist and include, a fitness application, a calendar application, a search application, a map or navigation application, a transportation service application (e.g., a bus or train tracking application), a social media application, a game application, an e-mail application, a chat or messaging application, an Internet browser application, or any and all other applications that may execute at computing device 210.

Search module 282 of computing device 210 may perform integrated search functions on behalf of computing device 210. Search module 282 may be invoked by UI module 220, one or more of application modules 226, and/or assistant module 222 to perform search operations on their behalf. When invoked, search module 282 may perform search functions, such as generating search queries and executing searches based on generated search queries across various local and remote information sources. Search module 282 may provide results of executed searches to the invoking component or module. That is, search module 282 may output search results to UI module 220, assistant module 222, and/or application modules 226 in response to an invoking command.

Context module 230 may collect contextual information associated with computing device 210 to define a context of computing device 210. Specifically, context module 210 is primarily used by assistant module 222 to define a context of computing device 210 that specifies the characteristics of the physical and/or virtual environment of computing device 210 and a user of computing device 210 at a particular time.

As used throughout the disclosure, the term "contextual information" is used to describe any information that can be used by context module 230 to define the virtual and/or physical environmental characteristics that a computing device, and the user of the computing device, may experience at a particular time. Examples of contextual information are numerous and may include: an account associated with computing device 210 (e.g., a user account currently signed into computing device 210), a network to which computing device 210 is currently connected (e.g., a service set identifier (SSID) of a Wi-Fi network), sensor information obtained by sensors (e.g., position sensors, accelerometers, gyros, barometers, ambient light sensors, proximity sensors, microphones, and any other sensor) of computing device 210, communication information (e.g., text based communications, audible communications, video communications, etc.) sent and received by communication modules of computing device 210, and application usage information associated with applications executing at computing device 210 (e.g., application data associated with applications, Internet search histories, text communications, voice and video communications, calendar information, social media posts and related information, etc.). Further examples of contextual information include signals and information obtained from transmitting devices that are external to computing device 210. For example, context module 230 may receive, via a radio or communication unit of computing device 210, beacon information transmitted from external beacons located at or near a physical location of a merchant.

Assistant module 222 may include all functionality of local assistant module 122A of computing device 110 of FIG. 1 and may perform similar operations as local assistant module 122A for providing an assistant. In some examples, assistant module 222 may execute locally (e.g., at processors 240) to provide assistant functions. In some examples, assistant module 222 may act as an interface to a remote assistant service accessible to computing device 210. For example, assistant module 222 may be an interface or application programming interface (API) to remote assistant module 122B of assistant server system 160 of FIG. 1.

Device selection module 224 may include all functionality of device selection module 124A of computing device 110 of FIG. 1 and may perform similar operations as device selection module 124A to identifying and selecting other computing devices. In some examples, device selection module 224 may execute locally (e.g., at processors 240) to identify and/or select other computing devices. In some examples, device selection module 224 may act as an interface to a remote device selection service accessible to computing device 210. For example, device selection module 224 may be an interface or application programming interface (API) to device selection module 124B of assistant server system 160 of FIG. 1.

Figure 3:
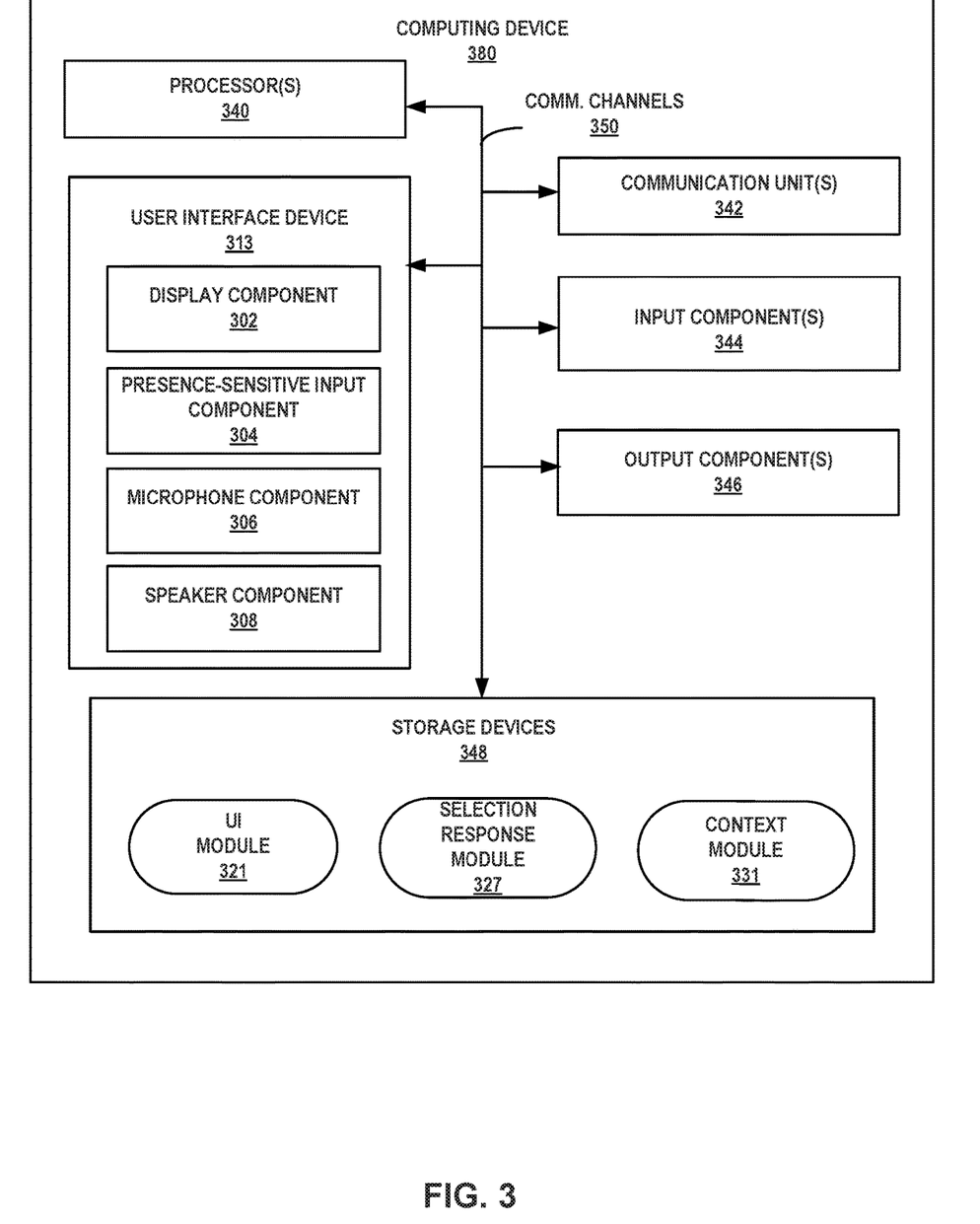
FIG. 3 is a block diagram illustrating an example computing device that is configured to be identified for selection by a virtual assistant, in accordance with one or more aspects of the present disclosure.

FIG. 3 is a block diagram illustrating an example computing device that is configured to be identified for selection by a virtual assistant, in accordance with one or more aspects of the present disclosure. Computing device 380 of FIG. 3 is described below as an example of a computing device of computing devices 180 of FIG. 1. FIG. 3 illustrates only one particular example of computing device 380, and many other examples of computing device 380 may be used in other instances and may include a subset of the components included in example computing device 380 or may include additional components not shown in FIG. 3.

As shown in the example of FIG. 3, computing device 380 includes user interface device (UID) 313, one or more processors 341, one or more communication units 343, one or more input components 345, one or more output components 347, and one or more storage devices 349. UID 313 includes display component 303, presence-sensitive input component 305, microphone component 307, and speaker component 309. Storage devices 349 of computing device 380 include UI module 321, selection response module 327, and context module 331.

Processors 340 are analogous to processors 240 of computing system 210 of FIG. 2. Communication units 342 are analogous to communication units 242 of computing system 210 of FIG. 2. UID 313 is analogous to UID 212 of computing system 210 of FIG. 2. Storage devices 348 are analogous to storage devices 248 of computing system 210 of FIG. 2. Input components 344 are analogous to input components 244 of computing system 210 of FIG. 2. Output components 346 are analogous to output components 246 of computing system 210 of FIG. 2. Communication channels 350 are analogous to communication channels 250 of computing system 210 of FIG. 2 and may therefore interconnect each of the components 340, 342, 344, 346, 313, and 348 for inter-component communications. In some examples, communication channels 350 may include a system bus, a network connection, an inter-process communication data structure, or any other method for communicating data.

UI module 321 may include all functionality of UI module 121 of computing device 180A of FIG. 1 and may perform similar operations as UI module 121. For example, UI module 321 of computing device 380 may receive information from selection response module 327 that includes instructions for satisfying an utterance (e.g., displaying video or playing audio). UI module 321 may transmit a display or audible output command and associated data over communication channels 350 to cause UID 313 to present the user interface at UID 313.

Context module 331 may be configured to perform functions similar to context module 231 of computing device 210 of FIG. 2. For instance, context module 331 may collect contextual information associated with computing device 380 to define a context of computing device 380. In some examples, context module 331 may update one or more other devices regarding the context of computing device 380. For instance, context module 331 may update a server system (e.g., assistant server system 160 of FIG. 1) regarding one or both of an identification of an account associated with computing device 380 and an identification of a network to which computing device 380 is currently connected. In some examples, context module 331 may update the other devices at regular time intervals (i.e., 5 minutes, 10 minutes, 30 minutes, 1 hour, 1 day). In some examples, context module 331 may update the other devices when the context of computing device 380 has changed (e.g., when computing device 380 connects to or disconnects from a network, when a new account is signed into at computing device 380).

Selection response module 327 may perform one or more actions to enable identification of computing device 380 to satisfy utterances spoken at another device, such as computing device 110 of FIG. 1 or computing device 210 of FIG. 2. In some examples, in response to receiving a request (e.g., from assistant server system 160 of FIG. 1) selection response module 327 may cause speaker component 309 of UID 313 to emit a sound. As discussed above, in some examples, the request may identify one or more unique audio characteristics (e.g., frequency) of the sound to be emitted. In some examples, selection response module 327 may cause one or more components of UID 313 to produce output (e.g., display video, display graphical user interfaces, emit sound, etc.) to satisfy an utterance spoken at another device.

Figure 4:
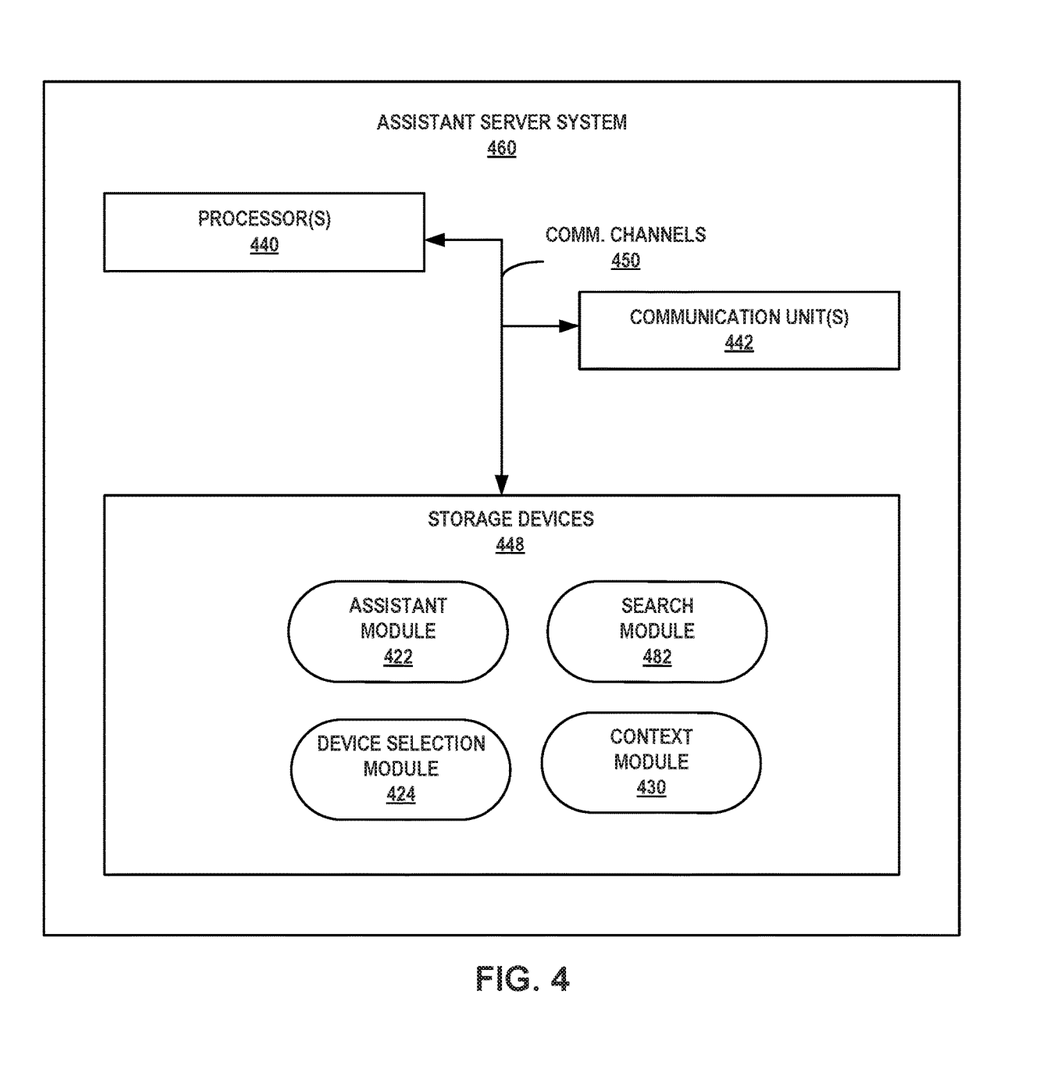
FIG. 4 is a block diagram illustrating an example computing system that is configured to execute an example virtual assistant, in accordance with one or more aspects of the present disclosure.

FIG. 4 is a block diagram illustrating an example computing system that is configured to execute an example virtual assistant, in accordance with one or more aspects of the present disclosure. Assistant server system 460 of FIG. 4 is described below as an example of assistant server system 160 of FIG. 1. FIG. 4 illustrates only one particular example of assistant server system 460, and many other examples of assistant server system 460 may be used in other instances and may include a subset of the components included in example assistant server system 460 or may include additional components not shown in FIG. 4.

As shown in the example of FIG. 4, assistant server system 460 includes user one or more processors 440, one or more communication units 442, and one or more storage devices 448. Storage devices 448 include assistant module 422, search module 482, context module 430, and device selection module 424.

Processors 440 are analogous to processors 240 of computing system 210 of FIG. 2. Communication units 442 are analogous to communication units 242 of computing system 210 of FIG. 2. Storage devices 448 are analogous to storage devices 248 of computing system 210 of FIG. 2. Communication channels 450 are analogous to communication channels 250 of computing system 210 of FIG. 2 and may therefore interconnect each of the components 440, 442, and 448 for inter-component communications. In some examples, communication channels 450 may include a system bus, a network connection, an inter-process communication data structure, or any other method for communicating data.

Search module 482 of assistant server system 460 is analogous to search module 282 of computing device 210 and may perform integrated search functions on behalf of assistant server system 460. That is, search module 482 may perform search operations on behalf of assistant module 422. In some examples, search module 482 may interface with external search systems to perform search operations on behalf of assistant module 422. When invoked, search module 482 may perform search functions, such as generating search queries and executing searches based on generated search queries across various local and remote information sources. Search module 482 may provide results of executed searches to the invoking component or module. That is, search module 482 may output search results to assistant module 422.

Context module 430 of assistant server system 460 is analogous to context module 230 of computing device 210. Context module 430 may collect contextual information associated with computing devices, such as computing device 110 and/or computing devices 180 of FIG. 1, computing device 210 of FIG. 2, and/or computing device 380 of FIG. 3, to define a context of the computing device. Context module 430 may primarily be used by assistant module 422 and/or search module 482 to define a context of a computing device interfacing and accessing a service provided by assistant server system 160. The context may specify the characteristics of the physical and/or virtual environment of the computing device and a user of the computing device at a particular time.

Assistant module 422 may include all functionality of local assistant module 122A and remote assistant module 122B of FIG. 1, as well as assistant module 222 of computing device 210 of FIG. 2. Assistant module 422 may perform similar operations as remote assistant module 122B for providing an assistant service that is accessible via assistant server system 460. That is, assistant module 422 may act as an interface to a remote assistant service accessible to a computing device that is communicating over a network with assistant server system 460. For example, assistant module 422 may be an interface or API to remote assistant module 122B of assistant server system 160 of FIG. 1.

Device selection module 424 may include all functionality of device selection module 124A and device selection module 124B of FIG. 1, as well as device selection module 224 of computing device 210 of FIG. 2. Device selection module 424 may perform similar operations as device selection module 124B for identifying and selecting other computing devices to satisfy spoken utterances. In some examples, device selection module 424 may be an interface or API to device selection module 124B of assistant server system 160 of FIG. 1.

In operation, device selection module 424 may maintain a list of computing devices that are related to a particular computing device (e.g., computing device 110 of FIG. 1 or computing device 210 of FIG. 1). For instance, device selection module 424 may identify, based on context information gathered by context module 430, one or more computing devices that are one or both connected to a same network as the particular computing device (e.g., one or more computing devices that are connected to a network with a same SSID as the particular computing device), and associated with a same account as the particular computing device (e.g., a same user account).

In response to receiving an indication that speech reception has been activated at the particular computing device, device selection module 424 may output, to each computing device of the identified computing devices related to the particular computing device, a request to emit a respective audio signal. For instance, device selection module 424 may assign a respective frequency to each of the identified computing devices related to the particular computing device and include indications of the assigned frequencies in the requests.

One or more of the audio signals emitted by the computing devices may be included in audio data generated by a microphone of the particular computing device. The particular computing device may process the audio data locally and/or may upload the audio data to assistant server system 460. As part of the processing, the particular computing device and/or assistant server system 460 may determine whether the audio data includes one or more of the assigned frequencies. If the audio data incudes one or more of the assigned frequencies, the particular computing device and/or assistant server system 460 may determine that the computing devices associated with the one or more assigned frequencies are eligible for utterance satisfaction.

The particular computing device and/or assistant server system 460 may also process the audio data to recognize a spoken utterance (e.g., using one or more speech recognition techniques). Based on the spoken utterance and the computing devices determined to be eligible for utterance satisfaction, the particular computing device and/or assistant server system 460 may select one or more computing devices to satisfy the recognized utterance. For instance, the particular computing device and/or assistant server system 460 may select the computing device(s) that are most well-suited to satisfy the utterance. The particular computing device and/or assistant server system 460 may cause the selected computing device(s) to satisfy the utterance.

Figure 5:
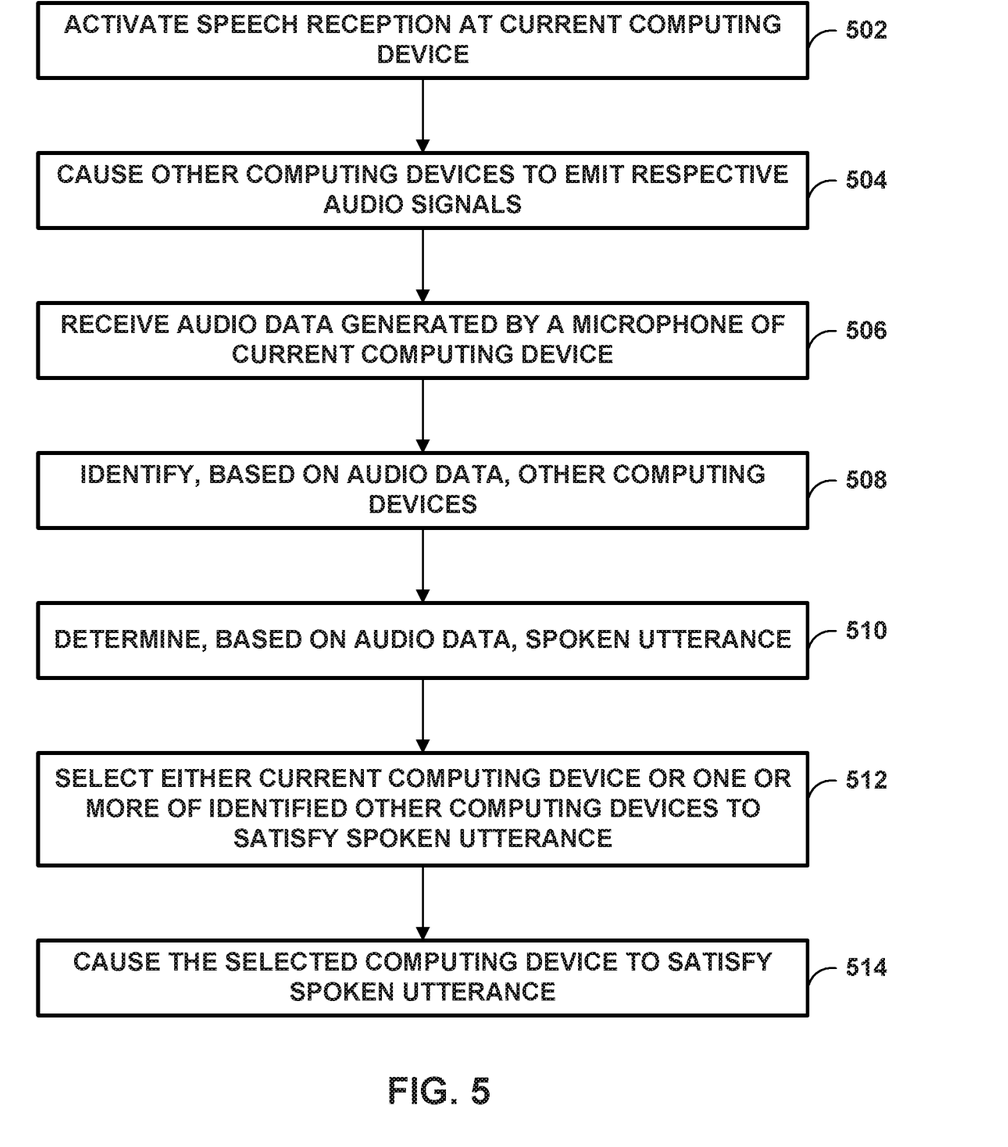
FIG. 5 is a flowchart illustrating example operations performed by one or more processors executing an example virtual assistant, in accordance with one or more aspects of the present disclosure.

FIG. 5 is a flowchart illustrating example operations performed by one or more processors executing an example virtual assistant, in accordance with one or more aspects of the present disclosure. FIG. 5 is described below in the context of system 100 of FIG. 1. For example, local assistant module 122A and device selection module 124A while executing at one or more processors of computing device 110 may perform one or more of operations 502-512, in accordance with one or more aspects of the present disclosure. And in some examples, remote assistant module 122B and device selection module 124B while executing at one or more processors of assistant server system 160 may perform one or more of operations 502-512, in accordance with one or more aspects of the present disclosure. For purposes of illustration only, FIG. 5 is described below within the context of computing device 110 of FIG. 1.

In operation, computing device 110 may activate speech reception (502). For example, a user of computing device 110 may press a speech reception button on computing device 110 or speak a predetermined activation phrase at UID 112 that is received by local assistant module 122A.

In response to the activation of speech reception, computing device 110 may cause other computing devices to emit respective audio signals (504). For instance, computing device 110 may cause one or more other computing devices that are related to computing device 110 to emit respective audio signals. Another computing device may be related to computing device 110 if the other computing device is one or both of connected to a same network as the current computing device and associated with a same account (e.g., a same user account) as the current computing device. In some examples, computing device 110 may cause to other computing devices to emit respective audio signals by at least outputting an indication that speech reception has been activated at computing device 110. Computing device 110 may output the indication to one or both of a server device and the related computing devices. In examples where computing device 110 outputs the indication to the server device, the server device may output a request to emit a respective audio signal to each computing device identified as related to computing device 110. In examples where computing device 110 outputs the indication directly to the related computing devices, the indication may include a request to emit a respective audio signal.

As discussed above, the audio signals emitted by the other computing devices may have one or more unique characteristics. One or more of the unique characteristics of an audio signal emitted by a particular computing device may be specified by a request received by the particular computing device. For instance, the request sent to the particular computing device may specify that the particular computing device output an audio signal with a specific frequency. As also discussed above, in some examples, the audio signals may be above the range of human speech and/or human hearing.

In any case, computing device 110 may receive audio data generated by a microphone of computing device 110 (506). For instance, computing device 110 may receive, with a microphone, acoustic input (e.g., audio data) that corresponds to a spoken utterance and the audio signals emitted by the other computing devices.

Computing device 110 may identify, based on the audio data, the other computing devices (508). For instance, if the received audio data includes a respective sound emitted by a respective computing device of the computing devices, computing device 110 may determine that the respective computing device is eligible for selection to satisfy the spoken utterance. Similarly, if the received audio data does not include a respective sound emitted by a respective computing device of the computing devices, computing device 110 may determine that the respective computing device not is eligible for selection to satisfy the spoken utterance.

In some examples, computing device 110 may identify whether the other computing devices are available (i.e., in-range) based on the audio data. In some examples, computing device 110 may determine additional context of the other computing devices based on the audio data. For instance, computing device 110 may determine an approximate distance between computing device 110 and each of the other identified computing devices based on the audio data. In some examples, computing device 110 may determine the approximate distances based on the received loudness of the sounds emitted by the other computing devices. For instance, if the audio data includes a first sound having a first loudness and a second sound having a second loudness that is lower than the first loudness, computing device 110 may determine that the computing device that emitted the first sound is closer than the computing device that emitted the second sound.

Computing device 110 may determine, based on the audio data, a spoken utterance (510). For instance, computing device 110 may perform speech recognition to determine a query or other request spoken by the user. As discussed above, in some examples, computing device 110 may simultaneously perform the speech recognition and identification of the other computing devices.

Computing device 110 may select, from computing device 110 and the identified other computing devices, one or more computing devices to satisfy the spoken utterance (512). For instance, if a particular computing device of the identified other computing devices is more well-suited to satisfy the user utterance than computing device 110, computing device 110 may select the particular computing device to satisfy the user utterance. As one example, if computing device 110 does not include a display and the utterance would be better satisfied with a display (e.g., if the user utterance is "what's on my agenda"), computing device 110 may select a computing device of the identified other computing devices that includes a display to satisfy the utterance. The utterance "what's on my agenda" may be better satisfied with a display because a visual representation of an agenda may be simpler to understand than, for instance, a synthesized voice reading the agenda. As another example, if computing device 110 includes a display and the utterance would be better satisfied with a larger display (e.g., if the user utterance is "play a video"), computing device 110 may select a computing device of the identified other computing devices that includes a relatively larger display to satisfy the utterance. The utterance "play a video" may be better satisfied with a relatively larger display because it may be less strenuous and/or more comfortable for a user to watch the video on a larger display (e.g., a TV). As another example, computing device 110 may select a computing device of the identified computing devices based on the determined distances. As another example, if the identified devices include a wireless speaker and satisfaction of the utterance involves playing music, computing device 110 may select the wireless speaker to play the music.

Computing device 110 may cause the selected computing device to satisfy the spoken utterance (514). For instance, computing device 110 may cause the selected computing device to produce output (e.g., display video, display graphical user interfaces, emit sound, etc.) in response to the utterance. In this way, computing device 110 may provide higher quality satisfaction of utterances.

The following numbered examples may illustrate one or more aspects of the disclosure.

Example 1. A method comprising: receiving audio data generated by a microphone of a current computing device; identifying, based on the audio data, one or more computing devices that each emitted a respective audio signal in response to speech reception being activated at the current computing device; and selecting either the current computing device or a particular computing device from the identified one or more computing devices to satisfy a spoken utterance determined based on the audio data.

Example 2. The method of example 1, further comprising: outputting, by the current computing device, an indication that speech reception has been activated at the current computing device.

Example 3. The method of example 2, wherein the current computing device is connected to a particular network, and wherein outputting the indication that speech reception has been activated at the current computing device comprises: causing, by the current computing device, one or more other computing devices connected to the particular network to emit respective audio signals, wherein the one or more other computing devices connected to the particular network include the identified one or more computing devices.

Example 4. The method of example 3, wherein the indication that speech reception has been activated at the current computing device is output to a server device, and wherein causing the one or more other computing devices connected to the particular network to emit the respective audio signals comprises: causing, by the current computing device, the server device to output a request to the one or more other computing devices connected to the particular network to emit respective audio signals.

Example 5. The method of any combination of examples 1-4, wherein the current computing device is associated with a particular user account, and wherein outputting the indication that speech reception has been activated at the current computing device comprises: causing, by the current computing device, one or more other computing devices associated with the particular user account to emit respective audio signals, wherein the one or more other computing devices associated with the particular user account include the identified one or more computing devices.

Example 6. The method of any combination of examples 1-5, wherein the indication that speech reception has been activated at the current computing device is output to a server device, and wherein causing the one or more other computing devices associated with the particular user account to emit the respective audio signals comprises: causing, by the current computing device, the server device to output a request to the one or more other computing devices associated with the particular user account to emit respective audio signals.

Example 7. The method of any combination of examples 1-6, wherein the current computing device is connected to a particular network and is associated with a particular user account, and wherein outputting the indication that speech reception has been activated at the current computing device comprises: causing, by the current computing device, one or more other computing devices connected to the particular network that are associated with the particular user account to emit respective audio signals, wherein the one or more other computing devices connected to the particular network that are associated with the particular user account include the identified one or more computing devices.

Example 8. The method of any combination of examples 1-7, further comprising: identifying, by a server device, one or more computing devices related to the current computing device; and in response to receiving an indication that speech reception has been activated at the current computing device, outputting, by the server device and to each computing device of the identified one or more computing devices related to the current computing device, a request to emit a respective audio signal.

Example 9. The method of any combination of examples 1-8, wherein identifying the one or more computing devices related to the current computing device comprises: identifying, by the server device, one or more computing devices that are one or both of: connected to a same network as the current computing device; and associated with a same user account as the current computing device.

Example 10. The method of any combination of examples 1-9, wherein identifying comprises: determining, based on the respective audio signals emitted by the one or more respective computing devices, a respective proximity of each respective computing device relative to the current computing device.

Example 11. The method of any combination of examples 1-10, wherein each audio signal of the respective audio signals has one or more unique audio characteristics.

Example 12. The method of any combination of examples 1-11, wherein the current computing device does not include a display, and wherein selecting comprises: responsive to determining that a display is needed to satisfy the spoken utterance, selecting the particular computing device from computing devices included in the identified one or more computing devices that include a display.

Example 13. The method of any combination of examples 1-12, wherein the current computing device includes a display, and wherein selecting a computing device from the identified one or more computing devices comprises: selecting the particular computing device from computing devices included in the identified one or more computing devices that include a display that is larger than the display of the current computing device.

Example 14. A device comprising: one or more microphones; and one or more processors configured to: receive audio data generated by a microphone of a current computing device; identify, based on the audio data, one or more computing devices that each emitted a respective audio signal in response to speech reception being activated at the current computing device; and select either the current computing device or a particular computing device from the identified one or more computing devices to satisfy a spoken utterance determined based on the audio data.

Example 15. The device of example 14, wherein the device is the current computing device, the current computing device further comprising one or more communication units, and wherein the one or more processors are further configured to: output, via the one or more communication units, an indication that speech reception has been activated at the current computing device.

Example 16. The device of example 15, wherein the current computing device is connected to a particular network, and wherein, to output the indication that speech reception has been activated at the current computing device, the one or more processors are configured to: cause one or more other computing devices connected to the particular network to emit respective audio signals, wherein the one or more other computing devices connected to the particular network include the identified one or more computing devices.

Example 17. The device of any combination of examples 14-16, wherein the current computing device is associated with a particular user account, and wherein, to output the indication that speech reception has been activated at the current computing device, the one or more processors are configured to: cause one or more other computing devices associated with the particular user account to emit respective audio signals, wherein the one or more other computing devices associated with the particular user account include the identified one or more computing devices.

Example 18. The device of any combination of examples 14-17, wherein the one or more processors are further configured to: identify one or more computing devices related to the current computing device; and in response to determining that speech reception has been activated at the current computing device, output, to each computing device of the identified one or more computing devices related to the current computing device, a request to emit a respective audio signal.

Example 19. The device of any combination of examples 14-18, wherein, to identify the one or more computing devices related to the current computing device, the one or more processors are configured to: identify one or more computing devices that are one or both of: connected to a same network as the current computing device; and associated with a same user account as the current computing device.

Example 20. A non-transitory computer-readable storage medium storing instructions that, when executed, cause one or more processors of a computing device to: receive audio data generated by a microphone of a current computing device; identify, based on the audio data, one or more computing devices that each emitted a respective audio signal in response to speech reception being activated at the current computing device; and select either the current computing device or a particular computing device from the identified one or more computing devices to satisfy a spoken utterance determined based on the audio data.

Example 21. The non-transitory computer-readable storage medium further storing instructions that cause the one or more processors to perform the method of any combination of examples 1-13.

Example 22. A device comprising means for performing the method of any combination of examples 1-13.

Throughout the disclosure, examples are described where a computing device and/or a computing system analyzes information (e.g., context, locations, communications, contacts, chat conversations, voice conversations, etc.) associated with a computing device and a user of a computing device, only if the computing device receives permission from the user of the computing device to analyze the information. For example, in situations discussed below, before an assistant executing at a computing device or computing system can collect or may make use of information associated with a user, the user may be provided with an opportunity to provide input to control whether the assistant (or other programs or features of the computing device and/or computing system) can collect and make use of user information or to dictate whether and/or how to computing devices and/or computing systems may receive content that may be relevant to the user. In addition, certain data may be encrypted and/or treated in one or more ways before it is stored or used by the assistant or underlying computing device and/or computing system, so that personally-identifiable information is removed. For example, a user's identity may be treated so that no personally identifiable information can be determined about the user, or a user's geographic location may be generalized where location information is obtained (such as to a city, ZIP code, or state as opposed to a coordinate location or physical address), so that a particular location of a user cannot be determined. Thus, the user may have control over how information is collected about the user and used by the assistant and the underlying computing device and computing system that executes the assistant.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
   detecting, at a first computing device that is located in a physical environment and that is connected to a particular Wi-Fi network, actuation of a hardware button; and
   in response to detecting the actuation of the hardware button at the first computing device:
   transmitting, by the first computing device, a message, wherein transmitting the message:
   causes a second computing device, that is also located in the physical environment and that is also connected to the particular Wi-Fi network, to audibly emit a second device audio signal via a second device speaker component of the second computing device, and
   causes a third computing device, that is also located in the physical environment and that is also connected to the particular Wi-Fi network, to audibly emit a third device audio signal via a third device speaker component of the third computing device, wherein the second device audio signal and the third device audio signal are each above a range of human hearing;
   detecting, at the first computing device and via one or more microphones of the first computing device, the second device audio signal and the third device audio signal;

selecting, based on the detection of the second device audio signal and the third device audio signal, a particular computing device from among at least the second computing device and the third computing device; and in response to selecting the particular computing device:

causing the particular computing device to provide audible output.

2. The method of claim 1, wherein selecting the particular computing device based on the detection of the second device audio signal and the third device audio signal comprises:

determining, based on the second device audio signal as detected at the first computing device, a second device proximity of the second computing device to the first computing device;

determining, based on the third device audio signal as detected at the first computing device, a third device proximity of the third computing device to the first computing device; and selecting the particular computing device from among at least the second computing device and the third computing device is based on the second device proximity and the third device proximity.

3. The method of claim 2, wherein determining the second device proximity of the second computing device to the first computing device based on the second device audio signal is based on a second device audio signal loudness of the second device audio signal.

4. The method of claim 3, wherein determining the third device proximity of the third computing device to the first computing device based on the third device audio signal is based on a third device audio signal loudness of the third device audio signal.

5. The method of claim 1, wherein the second device audio signal has a second device audible emission frequency, and wherein the third device audio signal has a third device audible emission frequency.

6. The method of claim 5, wherein the second device audible emission frequency differs from the third device audible emission frequency.

7. The method of claim 1, wherein causing the particular computing device to provide the audible output comprises:

causing the particular computing device to play music as the audible output.

8. The method of claim 1, wherein transmitting the message is over the particular Wi-Fi network.

9. The method of claim 1, wherein transmitting the message further causes a fourth computing device, that is also located in the physical environment and that is also connected to the particular Wi-Fi network, to audibly emit a fourth device audio signal via a fourth device speaker component of the fourth computing device, wherein the fourth device audio signal is also above the range of human hearing, and further comprising:

detecting, at the first computing device and via one or more of the microphones of the first computing device, the fourth device audio signal and the third device audio signal;

wherein selecting the particular computing device is further based on the detection of the fourth device audio signal, and is from among at least the second computing device, the third computing device, and the fourth computing device.

10. A battery powered device comprising:
one or more microphones,
one or more Wi-Fi network interfaces;
one or more hardware buttons;
one or more processors; and
memory storing instructions that, when executed, cause one or more of the processors to:

detect actuation of the hardware button; and in response to detecting the actuation of the hardware button:

transmit a message that:

causes a computing device to audibly emit a device audio signal via a device speaker component of the computing device, and causes an additional computing device to audibly emit an additional device audio signal via an additional device speaker component of the additional computing device, wherein the device audio signal and the additional device audio signal are each above a range of human hearing;

detect, via one or more of the microphones, the device audio signal and the additional device audio signal;

select, based on the detection of the audio signal and the additional device audio signal, a particular computing device from among the computing device and the additional computing device; and in response to selecting the particular computing device:

causing the particular computing device to provide audible output.

11. The battery powered device of claim 10, wherein the instructions to select the particular computing device based on the detection of the audio signal and the additional device audio signal comprise instructions to:

determine, based on the audio signal as detected at the battery powered device, a device proximity of the computing device to the battery powered device;

determine, based on the additional audio signal as detected at the battery powered device, an additional device proximity of the additional computing device to the battery powered device; and select the particular computing device from among at least the computing device and the additional computing device based on the device proximity and the additional device proximity.

12. The battery powered device of claim 11, wherein the instructions to determine the device proximity of the computing device to the battery powered device based on the audio signal comprise instructions to determine the device proximity based on an audio signal loudness of the device audio signal.

13. The battery powered device of claim 12, wherein the instructions to determine the additional device proximity of the additional computing device to the battery powered device based on the additional device audio signal comprise instructions to determine the additional device proximity based on an additional device audio signal loudness of the additional device audio signal.

14. The battery powered device of claim 10, wherein the instructions to cause the particular computing device to provide the audible output comprise instructions to:

cause the particular computing device to play music as the audible output.

15. The battery powered device of claim 10, wherein the instructions to transmit the message comprise instructions to transmit the message over a particular Wi-Fi network and via one or more of the Wi-Fi network interfaces.

16. The battery powered device of claim 15, wherein the battery powered device, the computing device, and the additional computing device are connected over the particular Wi-Fi network.

17. The battery powered device of claim 9, wherein the message further causes a further additional computing device to audibly emit a further additional device audio signal via a further additional device speaker component of the further additional computing device, wherein the further additional device audio signal is also above the range of human hearing, and wherein the instructions further comprise instructions to:
- detect, via one or more of the microphones, the further additional device audio signal;
- wherein selecting the particular computing device is further based on the detection of the further additional device audio signal, and is from among at least the computing device, the additional computing device, and the further additional computing device.

18. A system of computing devices comprising:
- at least a first computing device, a second computing device, and a third computing device that are each co-located in a physical environment and that are each connected to a particular Wi-Fi network; and
- the first computing device having memory storing instructions that, when executed, cause one or more processors to:
  - detect actuation of a hardware button; and
  - in response to detecting the actuation of the hardware button at the first computing device:
    - transmit a message that:
      - causes the second computing device to audibly emit a second device audio signal via a second device speaker component of the second computing device, and
      - causes the third computing device to audibly emit a third device audio signal via a third device speaker component of the third computing device,
      - wherein the second device audio signal and the third device audio signal are each above a range of human hearing;
    - detect, via one or more microphones of the first computing device, the second device audio signal and the third device audio signal;
    - select, based on the detection of the second device audio signal and the third device audio signal, a particular computing device from among at least the second computing device and the third computing device; and
    - in response to selecting the particular computing device:
      - cause the particular computing device to provide audible output.

19. The system of computing devices of claim 18, wherein the instructions to select the particular computing device based on the detection of the second device audio signal and the third device audio signal comprise instructions to:
- determine, based on the second device audio signal as detected at the first computing device, a second device proximity of the second computing device to the first computing device;
- determine, based on the third device audio signal as detected at the first computing device, a third device proximity of the third computing device to the first computing device; and
- select the particular computing device from among at least the second computing device and the third computing device is based on the second device proximity and the third device proximity.

20. The system of computing devices of claim 18, further comprising:
- a fourth computing device that is also co-located in the physical environment and that that is also connected to the particular Wi-Fi network,
- wherein the message further causes the fourth computing device to audibly emit a fourth device audio signal via a fourth device speaker component of the fourth computing device, wherein the fourth device audio signal is also above the range of human hearing, and wherein the instructions further comprise instructions to:
  - detect, at the first computing device and via one or more microphones of the first computing device, the fourth device audio signal and the third device audio signal;
  - wherein selecting the particular computing device is further based on the detection of the fourth device audio signal, and is from among at least the second computing device, the third computing device, and the fourth computing device.

* * * * *